(12) United States Patent
Suk et al.

(10) Patent No.: US 10,997,735 B2
(45) Date of Patent: May 4, 2021

(54) METHOD, SYSTEM AND NON-TRANSITORY COMPUTER-READABLE RECORDING MEDIUM FOR CALCULATING A MOTION LOCUS OF A SUBJECT

(71) Applicant: CREATZ., INC., Suwon-si (KR)

(72) Inventors: Yong Ho Suk, Gyeonggi-do (KR); Jey Ho Suk, Seoul (KR)

(73) Assignee: CREATZ., INC., Suwon-si (KR)

( * ) Notice: Subject to any disclaimer, the term of this patent is extended or adjusted under 35 U.S.C. 154(b) by 0 days.

(21) Appl. No.: 16/666,687

(22) Filed: Oct. 29, 2019

(65) Prior Publication Data

US 2020/0134842 A1  Apr. 30, 2020

(30) Foreign Application Priority Data

Oct. 29, 2018 (KR) .......................... 10-2018-0130225

(51) Int. Cl.
    *G06T 7/246* (2017.01)
(52) U.S. Cl.
    CPC .... *G06T 7/248* (2017.01); *G06T 2207/30224* (2013.01); *G06T 2207/30241* (2013.01)
(58) Field of Classification Search
    None
    See application file for complete search history.

(56) References Cited

U.S. PATENT DOCUMENTS

| | | | | |
|---|---|---|---|---|
| 2011/0250939 A1* | 10/2011 | Hobler | ............... | G09F 27/00 463/7 |
| 2014/0111625 A1* | 4/2014 | Dawe | ............... | G06T 7/64 348/47 |
| 2014/0247345 A1* | 9/2014 | Suk | ............... | A63F 13/20 348/139 |
| 2015/0103168 A1* | 4/2015 | Marty | ............... | G06T 7/246 348/143 |
| 2016/0074735 A1* | 3/2016 | Dawe | ............... | G09B 9/00 463/3 |
| 2020/0346091 A1* | 11/2020 | Oh | ............... | A63B 24/00 |

* cited by examiner

*Primary Examiner* — Idowu O Osifade
(74) *Attorney, Agent, or Firm* — Dinsmore & Shohl LLP; Yongsok Choi, Esq.

(57) ABSTRACT

The present invention relates to a method, system, and non-transitory computer-readable recording medium for calculating a motion trajectory of a subject. According to one aspect of the invention, there is provided a method for calculating a motion trajectory of a subject, the method comprising the steps of: acquiring at least three images of a subject using one imaging module; and calculating a motion trajectory of the subject with reference to the at least three acquired images, on the basis of each of at least three positions determined by a projection from a viewpoint of the imaging module to the subject on a background, and at least three virtual lines passing through a position where the imaging module is disposed.

7 Claims, 5 Drawing Sheets

METHOD, SYSTEM AND NON-TRANSITORY COMPUTER-READABLE RECORDING MEDIUM FOR CALCULATING A MOTION LOCUS OF A SUBJECT

CROSS-REFERENCE TO RELATED APPLICATION(S)

This application claims priority to Korean Patent Application No. 10-2018-0130225 filed on Oct. 29, 2018, the entire contents of which are hereby incorporated by reference.

FIELD OF THE INVENTION

The present invention relates to a method, system, and non-transitory computer-readable recording medium for calculating a motion trajectory of a subject.

BACKGROUND

Virtual golf systems are widely spreading which allow golfers to virtually play golf at low cost in downtown areas and the like. The basic concept of such virtual golf systems is to acquire a plurality of images in which a golf ball is photographed after the golf ball is hit by a golfer, measure physical quantities of the golf ball on the basis of a trajectory, interval, size, and the like thereof, perform a simulation of movement of the golf ball, and show a result of the simulation on a display.

Conventionally, in order to identify the above physical quantities of the golf ball (particularly, the direction or speed of the movement of the golf ball), a technique has been employed which causes a plurality of synchronized cameras to simultaneously photograph the golf ball, and uses information on the absolute or relative positions of the photographed golf ball images or the sizes of the golf ball images.

However, according to the above conventional technique, it is possible to accurately identify the physical quantities of the golf ball only when the plurality of cameras are perfectly synchronized. In practice, synchronization failure has frequently occurred due to a variety of variables such as communication delays, and a problem of cost increase has been caused depending on the number of cameras since two or more cameras are inevitably required. Further, although some conventional techniques using only one camera have been introduced, they have a problem of causing large measurement errors in physical quantities of a golf ball.

In this connection, the inventor(s) present herein a novel and inventive technique for easily and accurately calculating a motion trajectory of a golf ball using only one camera.

SUMMARY OF THE INVENTION

One object of the present invention is to solve all the above-described problems in the prior art.

Another object of the invention is to accurately calculate a motion trajectory of a subject using only one camera.

Yet another object of the invention is to accurately calculate a motion trajectory of a subject at low cost.

The representative configurations of the invention to achieve the above objects are described below.

According to one aspect of the invention, there is provided a method for calculating a motion trajectory of a subject, the method comprising the steps of: acquiring at least three images of a subject using one imaging module; and calculating a motion trajectory of the subject with reference to the at least three acquired images, on the basis of each of at least three positions determined by a projection from a viewpoint of the imaging module to the subject on a background, and at least three virtual lines passing through a position where the imaging module is disposed.

In addition, there are further provided other methods and systems to implement the invention, as well as computer-readable recording media having stored thereon computer programs for executing the methods.

According to the invention, it is possible to accurately calculate a motion trajectory of a subject using only one camera.

According to the invention, it is possible to accurately calculate a motion trajectory of a subject at low cost.

DETAILED DESCRIPTION

Figure 1:
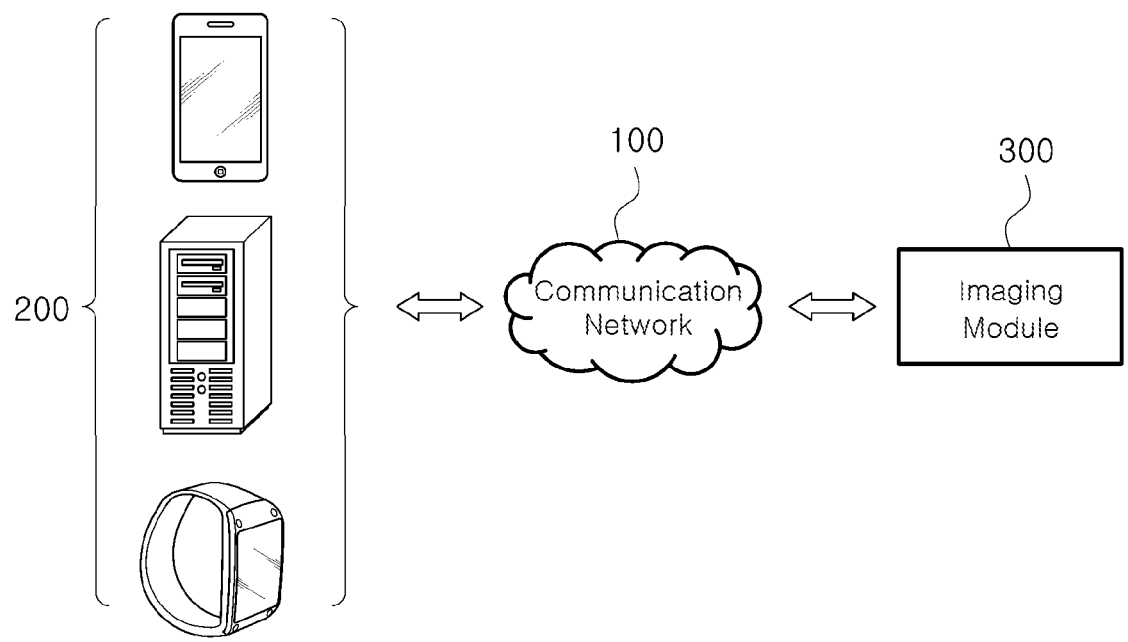
FIG. 1 schematically shows the configuration of an entire system for calculating a motion trajectory of a subject according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for calculating a motion trajectory of a subject according to one embodiment of the invention.

As shown in FIG. 1, the entire system according to one embodiment of the invention may comprise a communication network 100, a calculation system 200, and an imaging module 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication.

Next, the calculation system 200 according to one embodiment of the invention may be a digital device having a memory means and a microprocessor for computing capabilities. The calculation system 200 may be a server system.

According to one embodiment of the invention, the calculation system 200 may function to acquire at least three images of a subject using the imaging module 300 to be described below, and to calculate a motion trajectory of the subject in a reference space with reference to the at least three images, on the basis of a positional relationship between a position where the imaging module 300 is disposed and at least three positions determined by a projection from a viewpoint of the imaging module 300 to the subject on a background opposite to the imaging module 300.

The reference space according to one embodiment of the invention may encompass a space defined in a three-dimensional reference coordinate system for the calculation system 200.

The configuration and functions of the calculation system 200 according to the invention will be discussed in more detail below. Meanwhile, although the calculation system 200 has been described as above, the above description is illustrative, and it will be apparent to those skilled in the art that at least a part of the functions or components required for the calculation system 200 may be implemented or included in an external system (not shown), as necessary.

Next, the imaging module 300 according to one embodiment of the invention may be connected with the calculation system 200 via the communication network 100, and may function to acquire images of a subject by photographing the subject at predetermined time or frame intervals. The imaging module 300 may include a two-dimensional or three-dimensional camera, an infrared or ultraviolet camera, and the like.

Configuration of the Calculation System

Hereinafter, the internal configuration of the calculation system 200 crucial for implementing the invention and the functions of the respective components thereof will be discussed.

Figure 2:
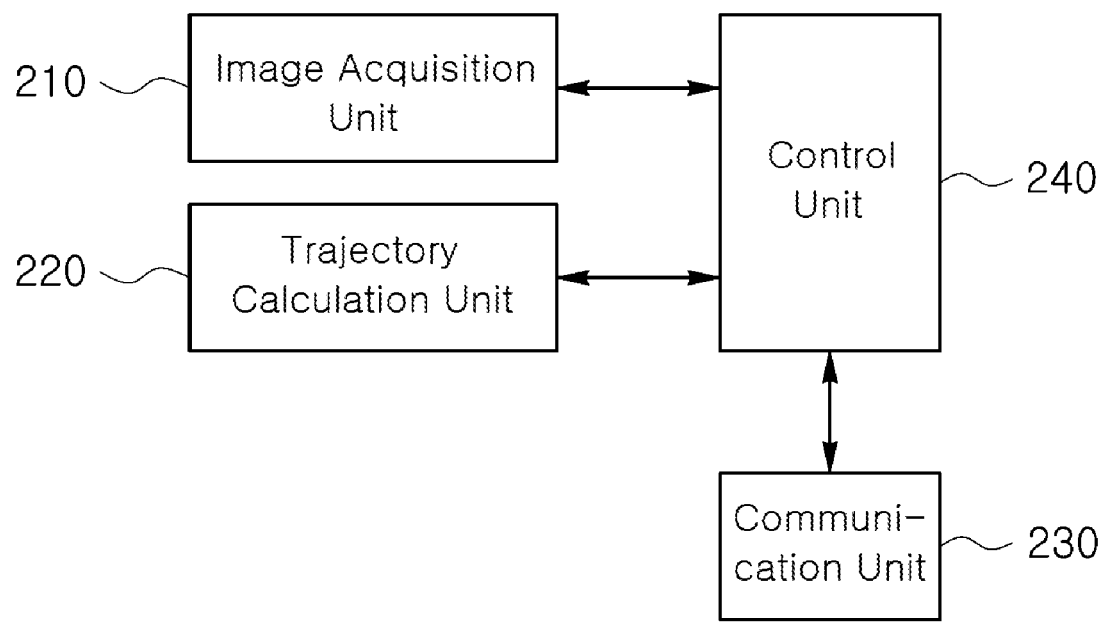
FIG. 2 specifically shows the internal configuration of a calculation system according to one embodiment of the invention.

FIG. 2 specifically shows the internal configuration of the calculation system 200 according to one embodiment of the invention.

Referring to FIG. 2, the calculation system 200 according to one embodiment of the invention may comprise an image acquisition unit 210, a trajectory calculation unit 220, a communication unit 230, and a control unit 240. According to one embodiment of the invention, at least some of the image acquisition unit 210, the trajectory calculation unit 220, the communication unit 230, and the control unit 240 may be program modules that communicate with the imaging module 300. The program modules may be included in the calculation system 200 in the form of operating systems, application program modules, and other program modules, while they may be physically stored in a variety of commonly known storage devices. Further, the program modules may also be stored in a remote storage device that may communicate with the calculation system 200. Meanwhile, such program modules may include, but are not limited to, routines, subroutines, programs, objects, components, and data structures for performing specific tasks or executing specific abstract data types according to the invention as will be described below.

First, the image acquisition unit 210 according to one embodiment of the invention may function to acquire at least three images of a subject using the imaging module 300.

Specifically, the image acquisition unit 110 according to one embodiment of the invention may acquire at least three images containing the subject from the imaging module 300 at predetermined time or frame intervals. According to one embodiment of the invention, the intervals may be defined on the basis of a photographing cycle (e.g., frames per second (FPS)) of the imaging module 300.

Meanwhile, the images of the subject acquired by the image acquisition unit 210 may preferably be acquired within a sufficiently short time (e.g., the time taken for the speed of the subject to decrease only slightly from its initial speed) from when the subject starts to move. In this case, for convenience, it may be assumed that the subject moves along a straight trajectory and the speeds of the movement along the trajectory are all the same.

Next, the trajectory calculation unit 220 according to one embodiment of the invention may function to calculate a motion trajectory of the subject with reference to the at least three images acquired by the image acquisition unit 210, on the basis of each of at least three positions determined by a projection from a viewpoint of the imaging module 300 to the subject on a background opposite to the imaging module 300, and at least three virtual lines passing through a position where the imaging module 300 is disposed.

Specifically, the trajectory calculation unit 220 may determine at least two virtual line pairs each consisting of any two of the at least three virtual lines as above, and may calculate the motion trajectory of the subject on the basis of the at least two determined virtual line pairs and information on an image acquisition time interval corresponding to each of the pairs. For example, as for a pair consisting of a first virtual line and a second virtual line, the image acquisition time interval may be an interval between a time point at which an image corresponding to the first virtual line is acquired and a time point at which an image corresponding to the second virtual line is acquired.

Figure 3:
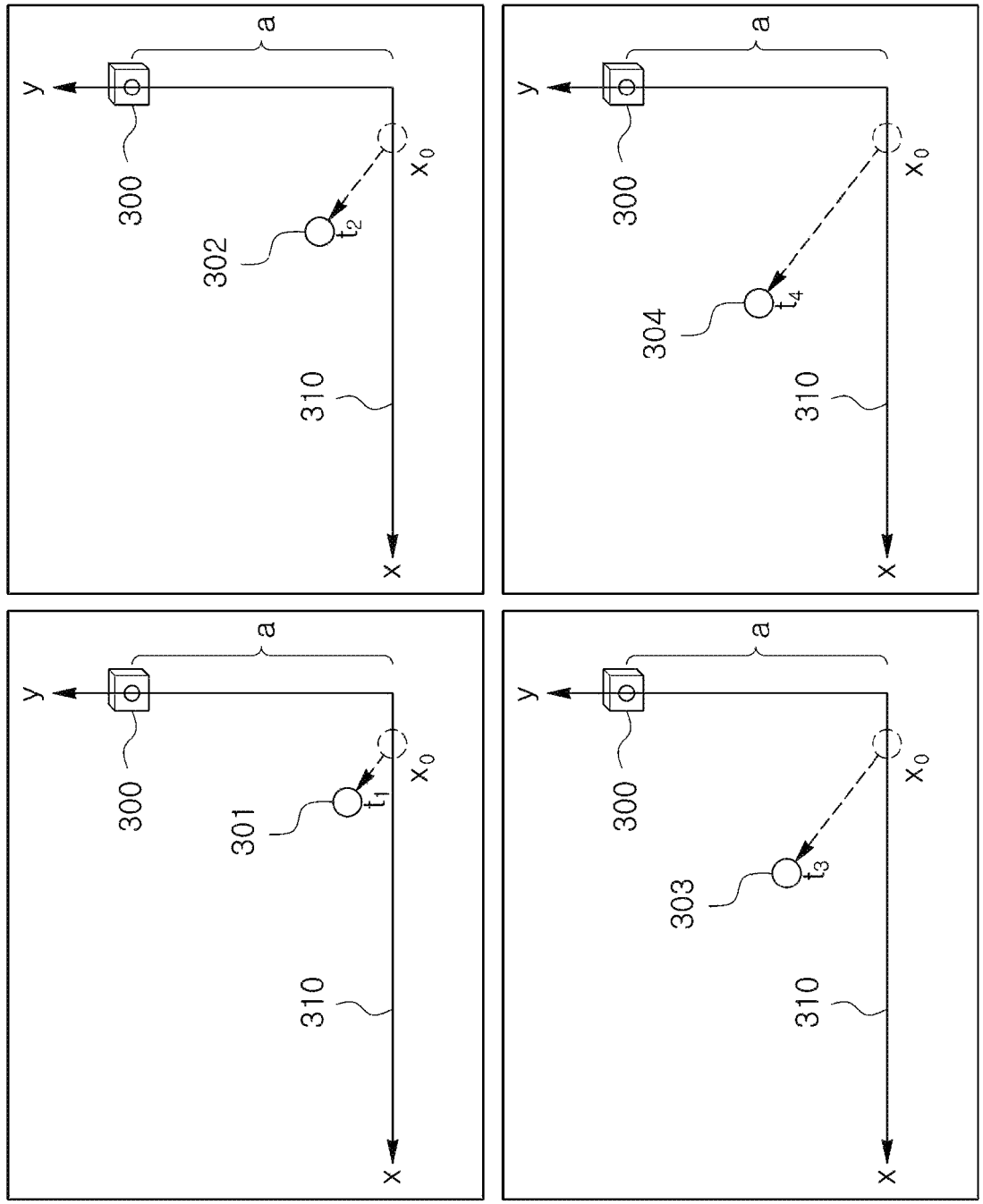
FIGS. 3 and 4 conceptually show how a motion trajectory of a subject is calculated according to one embodiment of the invention.
Figure 4:
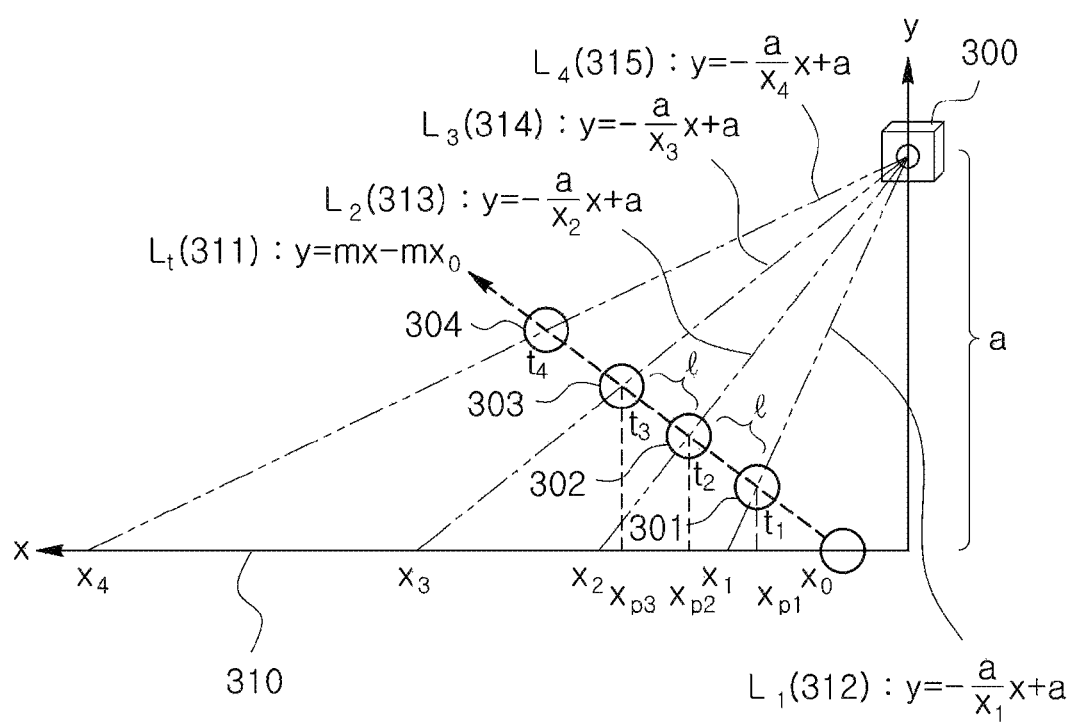

This will be discussed with further reference to FIGS. 3 and 4 below. FIGS. 3 and 4 conceptually show how a motion trajectory of a subject is calculated according to one embodiment of the invention.

As shown in FIGS. 3 and 4, a background 310 opposite to the imaging module 300 and a straight line running perpendicularly from the background 310 to the imaging module 300 may be simply schematized as the x-axis and the y-axis, respectively. In this case, the coordinates where the imaging module is disposed (i.e., (0, a)) and the coordinates where the subject is present before starting to move (i.e., $(x_0, 0)$) may be defined, respectively.

The image acquisition unit 210 may sequentially acquire first to fourth images 301, 302, 303, and 304 at time points $t_1$, $t_2$, $t_3$, and $t_4$ having the same time interval, respectively. The trajectory calculation unit 220 may accordingly assume a motion trajectory of the subject corresponding to the first to fourth images 301, 302, 303, and 304 to be a virtual straight line $L_t$ 311. The corresponding expression of $L_t$ 311 may be determined as $y=mx-mx_0$.

Meanwhile, a virtual straight line $L_1$ 312, which passes through a position on the background determined by a projection from a viewpoint of the imaging module 300 to the subject in the first image 301 and a position where the imaging module 300 is disposed, may be determined to have the corresponding expression of $y=-ax/x_1+a$. A virtual straight line $L_2$ 313, which passes through a position on the background determined by a projection from the viewpoint of the imaging module 300 to the subject in the second image 302 and the position where the imaging module 300 is disposed, may be determined to have the corresponding expression of $y=-ax/x_2+a$. A virtual straight line $L_3$ 314, which passes through a position on the background determined by a projection from the viewpoint of the imaging module 300 to the subject in the third image 303 and the position where the imaging module 300 is disposed, may be determined to have the corresponding expression of $y=-ax/x_3+a$. A virtual straight line $L_4$ 315, which passes through a position on the background determined by a projection from the viewpoint of the imaging module 300 to the subject in the fourth image 304 and the position where the imaging module 300 is disposed, may be determined to have the corresponding expression of $y=-ax/x_4+a$.

The trajectory calculation unit 220 may select at least two virtual line pairs each consisting of any two of the above four virtual lines, i.e., $L_1$ 312, $L_2$ 313, $L_3$ 314, and $L_4$ 315. For example, a pair of $L_1$ 312 and $L_2$ 313 and a pair of $L_2$ 313 and $L_3$ 314 may be selected. Here, the x-coordinates of the intersection points between $L_t$ 311 and $L_1$ 312, $L_2$ 313, and $L_3$ 314 may be calculated as $x_{p1}=x_0+(a-ax_0/x_1)/(m+a/x_1)$, $x_{p2}=x_0+(a-ax_0/x_2)/(m+a/x_2)$, and $x_{p3}=x_0+(a-ax_0/x_3)/(m+a/x_3)$, respectively. Since the time interval corresponding to the pair of $L_1$ 312 and $L_2$ 313 is the same as the time interval corresponding to the pair of $L_2$ 313 and $L_3$ 314, the distance between $x_p1$ and $x_p2$ is the same as the distance between $x_{p2}$ and $x_{p3}$. Through the above, the trajectory calculation unit 220 may calculate m. Accordingly, the trajectory calculation unit 220 may calculate $L_t$ 311 and consequently the trajectory of the subject may be calculated.

In the foregoing, it has been described that the time intervals corresponding to the virtual line pairs are the same, for convenience. However, even when the time intervals corresponding to the virtual line pairs are different, the motion trajectory of the subject may be calculated by determining that a ratio of the distance between $x_{p1}$ and $x_{p2}$ and the distance between $x_{p2}$ and $x_{p3}$ is the same as a ratio of the time interval between the time points at which the first image 301 and the second image 302 are acquired and the time interval between the time points at which the second image 302 and the third image 303 are acquired.

Meanwhile, in the above embodiment, the process of calculating the motion trajectory of the subject has been analyzed and described in two dimensions. However, the above process may be analyzed as reduced in one dimension or expanded in three dimensions, and any other methods of analysis may be employed as long as the objects of the invention may be achieved.

Further, the trajectory calculation unit 220 may calculate a direction and/or a speed of the movement of the subject with reference to the calculated motion trajectory of the subject and the time intervals of photographing of the imaging module 300. For example, the trajectory calculation unit 220 may easily calculate a speed of the movement of the subject by dividing a distance between coordinates specified in the motion trajectory of the subject by the time interval of photographing of the imaging module 300 corresponding to the specified coordinates.

Next, the communication unit 230 according to one embodiment of the invention may function to enable data transmission/reception from/to the image acquisition unit 210 and the trajectory calculation unit 220.

Lastly, the control unit 240 according to one embodiment of the invention may function to control data flow among the image acquisition unit 210, the trajectory calculation unit 220, and the communication unit 230. That is, the control unit 240 according to the invention may control data flow into/out of the calculation system 200 or data flow among the respective components of the calculation system 200, such that the image acquisition unit 210, the trajectory calculation unit 220, and the communication unit 230 may carry out their particular functions, respectively.

Figure 5:
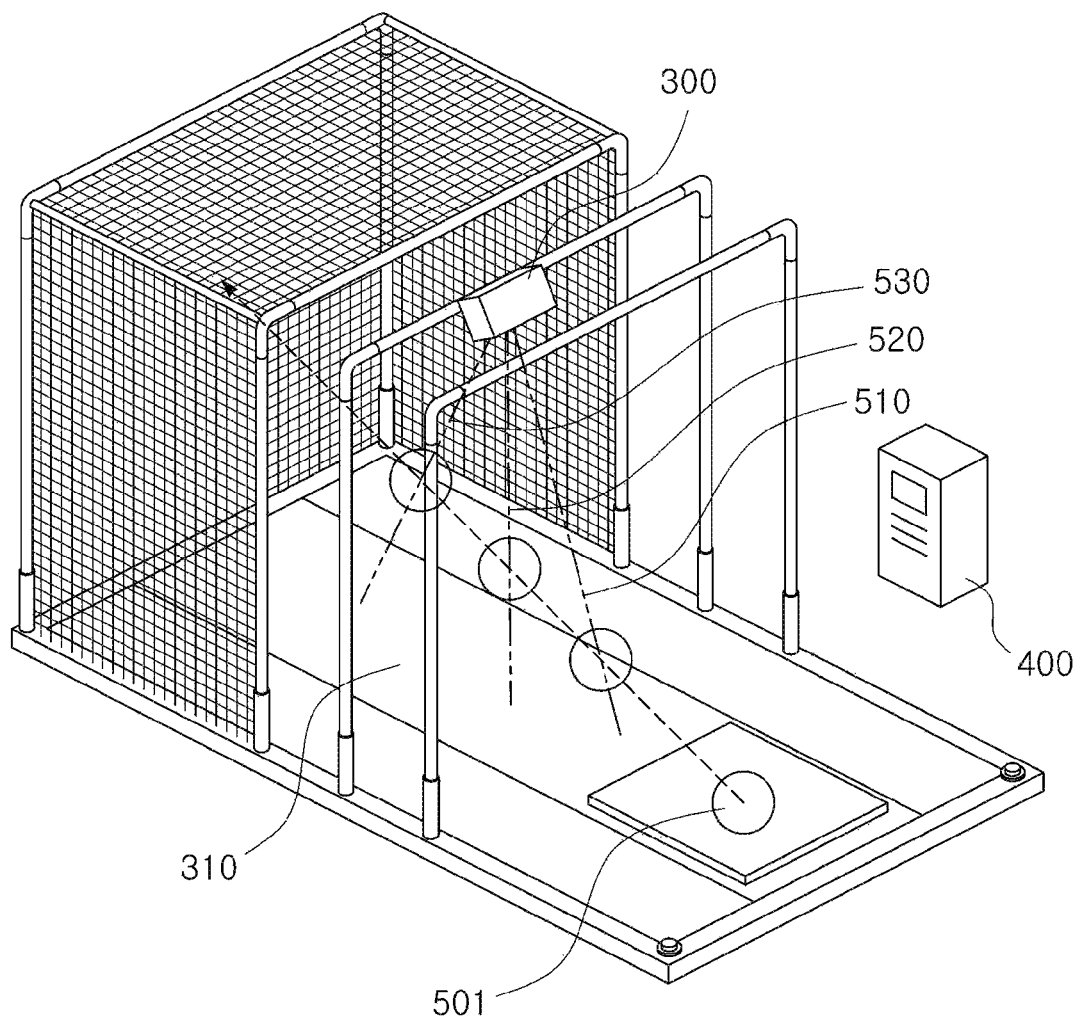
FIG. 5 illustratively shows a situation in which a calculation system according to one embodiment of the invention is applied to an external system.

FIG. 5 illustratively shows a situation in which the calculation system 200 according to one embodiment of the invention is applied to an external system.

As shown in FIG. 5, it may be assumed that the calculation system 200 according to the invention is included in a conventional virtual golf simulation system 400. In this case, the subject may be a golf ball.

First, when a user hits a golf ball 501 present in a hitting zone using a golf club, the virtual golf simulation system 400 may acquire three images containing the golf ball using only one camera 300.

Next, the virtual golf simulation system 400 may calculate a motion trajectory of the golf ball with reference to the acquired images, on the basis of each of three positions determined by a projection from a viewpoint of the camera 300 to the golf ball on a background 310 opposite to the camera 300, and three virtual lines 510, 520, and 530 passing through a position where the camera 300 is disposed.

Next, the virtual golf simulation system 400 may calculate information on a direction, a speed, and the like of the movement of the golf ball on the basis of the calculated motion trajectory, and may perform a simulation of the movement of the golf ball on the basis of the calculated information and provide a result of the simulation via a display (not shown).

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for calculating a motion trajectory of a subject, the method comprising the steps of:
    acquiring at least three images of a subject using one imaging module; and
    calculating a motion trajectory of the subject with reference to the at least three acquired images, on the basis of at least three virtual lines passing through a position where the imaging module is disposed and each of at least three positions determined by a projection from a viewpoint of the imaging module to the subject on a background,
    wherein the calculating step comprises the step of determining at least two virtual line pairs each consisting of any two of the at least three virtual lines, and determining a ratio of distances between intersection points associated with the at least two virtual line pairs, on the basis of information on image acquisition time intervals corresponding to the at least two virtual line pairs.

2. The method of claim 1, wherein in the acquiring step, the at least three images are acquired at predetermined time or frame intervals.

3. The method of claim 1, wherein the method further comprises the step of:
    calculating a speed of movement of the subject by dividing a distance between coordinates specified in the calculated motion trajectory of the subject by a time interval of photographing of the imaging module corresponding to the specified coordinates.

4. A non-transitory computer-readable recording medium having stored thereon a computer program for executing the method of claim 1.

5. A system for calculating a motion trajectory of a subject, the system comprising:
    one imaging module; and
    a processor configured to
        acquire at least three images of a subject using the imaging module; and
        calculate a motion trajectory of the subject with reference to the at least three acquired images, on the basis of at least three virtual lines passing through a position where the imaging module is disposed and each of at least three positions determined by a projection from a viewpoint of the imaging module to the subject on a background,
    wherein the processor is configured to determine at least two virtual line pairs each consisting of any two of the at least three virtual lines, and to determine a ratio of distances between intersection points associated with the at least two virtual line pairs, on the basis of information on image acquisition time intervals corresponding to the at least two virtual line pairs.

6. The system of claim 5, wherein the processor is configured to acquire the at least three images at predetermined time or frame intervals.

7. The system of claim 5, wherein the processor is configured to calculate a speed of movement of the subject by dividing a distance between coordinates specified in the calculated motion trajectory of the subject by a time interval of photographing of the imaging module corresponding to the specified coordinates.

* * * * *